United States Patent
Hadar et al.

(10) Patent No.: US 10,326,765 B2
(45) Date of Patent: Jun. 18, 2019

(54) SYSTEM, METHOD, AND SOFTWARE FOR PROVIDING ACCESS CONTROL ENFORCEMENT CAPABILITIES IN CLOUD COMPUTING SYSTEMS

(71) Applicant: CA, Inc., New York, NY (US)

(72) Inventors: Ethan Hadar, Nesher (IL); Nimrod Vax, Tel Aviv (IL); Amir Jerbi, Givatayim (IL); Michael Kletskin, Matan (IL)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/346,145

(22) Filed: Nov. 8, 2016

(65) Prior Publication Data

US 2017/0054728 A1 Feb. 23, 2017

Related U.S. Application Data

(63) Continuation of application No. 12/565,474, filed on Sep. 23, 2009, now abandoned.

(51) Int. Cl.
*H04L 29/06* (2006.01)
*G06F 9/50* (2006.01)

(52) U.S. Cl.
CPC ............ *H04L 63/10* (2013.01); *G06F 9/5072* (2013.01); *H04L 63/20* (2013.01); *G06F 2209/505* (2013.01)

(58) Field of Classification Search
CPC ....... H04L 63/10; H04L 63/20; H04L 63/101; H04L 63/102; G06F 21/00; G06F 21/53; G06F 9/5072; G06F 9/4445; G06F 2009/505
See application file for complete search history.

(56) References Cited

U.S. PATENT DOCUMENTS

| | | | |
|---|---|---|---|
| 5,968,176 A | 10/1999 | Nessett et al. | |
| 2008/0046960 A1* | 2/2008 | Bade ..................... | G06F 9/4856 726/1 |
| 2009/0052451 A1 | 2/2009 | Etheridge | |
| 2009/0228967 A1* | 9/2009 | Gbadegesin ........ | H04L 63/0807 726/8 |
| 2009/0327905 A1* | 12/2009 | Mascarenhas .......... | H04L 67/36 715/738 |
| 2010/0217850 A1* | 8/2010 | Ferris ..................... | H04L 63/20 709/223 |

(Continued)

*Primary Examiner* — Joseph P Hirl
*Assistant Examiner* — Chi D Nguy
(74) *Attorney, Agent, or Firm* — Baker Botts L.L.P.

(57) ABSTRACT

According to one embodiment, a system comprises one or more processors coupled to a memory. The one or more processors when executing logic encoded in the memory provide a topology manager. The topology manager is configured to maintain a security topology of a plurality of hosts. The security topology associates one or more virtual hosts policies with a plurality of virtual hosts in a cloud computing deployment. The topology manager is also configured to request a query for one or more hosts that are candidates to be enforced. A portability manager is configured to receive a request to deploy an access control agent on the one or more candidate hosts, determine an optimal agent to be deployed from a list of available agents, and deploy the optimal agent on the one or more candidate hosts.

21 Claims, 2 Drawing Sheets

(56) References Cited

U.S. PATENT DOCUMENTS

| | | | |
|---|---|---|---|
| 2010/0268812 A1* | 10/2010 | Mohrmann | G06F 21/53 709/224 |
| 2010/0299366 A1* | 11/2010 | Stienhans | G06F 9/5072 707/803 |
| 2011/0016214 A1* | 1/2011 | Jackson | G06F 9/5044 709/226 |
| 2012/0117244 A1* | 5/2012 | Melander | G06F 9/5044 709/226 |

* cited by examiner

SYSTEM, METHOD, AND SOFTWARE FOR PROVIDING ACCESS CONTROL ENFORCEMENT CAPABILITIES IN CLOUD COMPUTING SYSTEMS

CROSS-REFERENCE TO RELATED APPLICATION

This application is a Continuation of U.S. application Ser. No. 12/565,474, filed Sep. 23, 2009, the entire content of which is incorporated herein by reference.

TECHNICAL FIELD

The present invention relates generally to computer management, and more particularly to a system, method, and software for enforcing access control in cloud computing systems.

BACKGROUND

Cloud computing systems include computing resources. For example, cloud computing systems may include servers, network storage devices, and other information technology (IT) services. Cloud computing systems include proprietary interfaces to access their respective computing resources.

SUMMARY

According to one embodiment, a system comprises one or more processors coupled to a memory. The one or more processors when executing logic encoded in the memory provide a topology manager. The topology manager is configured to maintain a security topology of a plurality of hosts. The security topology associates one or more virtual hosts policies with a plurality of virtual hosts in a cloud computing deployment. The topology manager is also configured to request a query for one or more hosts that are candidates to be enforced. A portability manager is configured to receive a request to deploy an access control agent on the one or more candidate hosts, determine an optimal agent to be deployed from a list of available agents, and deploy the optimal agent on the one or more candidate hosts.

Certain embodiments of the present invention may provide one or more technical advantages. For example, a technical advantage of one embodiment may include the capability to prevent virtual machine sprawl. Another technical advantage of one embodiment may include the capability to protect the physical boundaries of virtual machines. Another technical advantage of one embodiment may include the capability to guard external management capabilities and prevent misuses of a cloud image by an unauthorized administrator. Another technical advantage of one embodiment may include the capability to accept and enforce customer security compliance needs on a cloud computing system.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Figure 1:
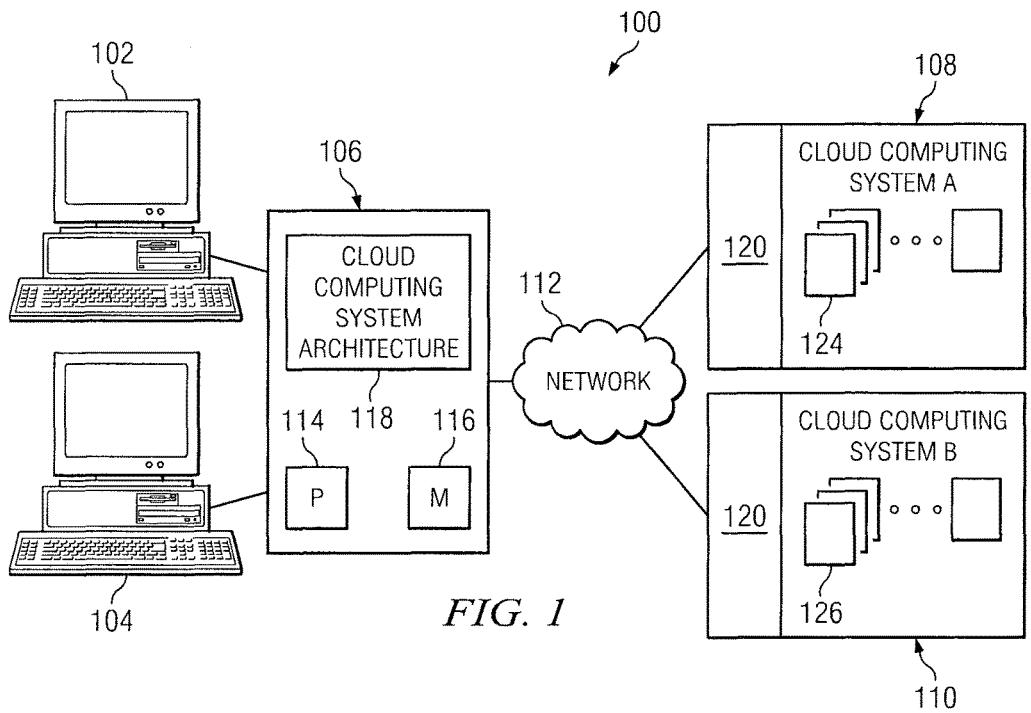
FIG. 1 illustrates an example system for providing access control enforcement capabilities in cloud computing systems, according to certain embodiments.

FIG. 1 illustrates an example system 100 for providing access control enforcement capabilities in cloud computing systems according to some embodiments. System 100 may include one or more user systems 102 and one or more administrative systems 104, one or more server systems 106, one or more cloud computing systems 108 and 110, and a network 112. Although this particular implementation of system 100 is illustrated and primarily described, embodiments may include any suitable implementation of system 100 according to particular needs.

In general, system 100 is operable to integrate between IT Information Library (ITIL) software components (such as ITIL V3 and any future versions of ITIL in EITM) and cloud computing systems. In certain embodiments, system 100 includes a cloud computing system architecture for integrating cloud computing systems with ITIL software components. For example, an external integration architecture may include several ITIL software components. According to certain embodiments, adapters are created in a cloud computing system architecture that bridge the architectural layer that encapsulates and abstracts the cloud computing systems while still integrating with enterprise ITIL software components. Thus, certain embodiments provide a set of components for life cycle phases of ITIL service management, from strategy to design, transition, and operation. In certain embodiments, the cloud computing system architecture is mapped to the different layers of the cloud computing systems, thus serving IT workshops and workers that rent cloud computing resources and manage the cloud computing systems within their own IT organization in an abstract manner. In certain embodiments, the cloud computing system architecture may serve the cloud computing system providers that manage their cloud computing systems and provide ITIL integration points to their customers.

System 100 may include one or more user systems 102 and one or more administrative systems 104. "User system 102" and "user of user system 102" may be used interchangeably. A user of user system 102 may include, for example, a human user or a computer program or other suitable software module for automatically interacting with user system 102. Likewise, "administrative system 104" and "user of administrative system 104" may be used interchangeably. A user of administrative system 104 may include, for example, a human user or a computer program or other suitable software module for automatically interacting with administrative system 104.

Each user system 102 and administrative system 104 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of administrative system 104. Each computer system may include a personal computer, workstation, network computer, kiosk, wireless data port, personal data assistant (PDA), one or more processors within these or other devices, or any other suitable processing device. As an example, system 100 may include multiple distributed user systems 102 and/or administrative systems 104. User systems 102 and administrative systems 104 may be physically distributed, being in different locations geographically remote from each other and from the other components of system 100, or logically distributed, being at approximately the same location as other user systems 102 and administrative systems 104 and the other components of system 100. For simplicity, the one or more user systems 102 and administrative systems 104 of system 100 are referred to throughout this description primarily in the singular. Although user system 102 and administrative system 104 are illustrated and primarily described as being separate, it is understood that the computer systems and the functionality associated with user system 102 and administrative system 104 may be combined or separated in any suitable manner.

System 100 may include one or more server systems 106, referred to primarily in the singular throughout the remainder of this description. Server system 106 may include one or more electronic computing devices operable to receive, transmit, process, and store data associated with system 100. For example, server system 106 may include one or more general-purpose PCs, Macintoshes, workstations, Unix-based computers, server computers, one or more server pools, or any other suitable devices. In certain embodiments, server system 106 includes a web server. In short, server system 106 may include any suitable combination of software, firmware, and hardware. Although a single server system 106 is illustrated, some embodiments contemplate system 100 including any suitable number of server systems 106. Moreover, although referred to as a "server system," some embodiments contemplate server system 106 comprising any suitable type of processing device or devices.

Server system 106 may be communicatively coupled to cloud computing systems 108 and 110 via network 112. Although not illustrated, user system 102 and administrative system 104 may be communicatively coupled to one another as well as to server system 106 via network 112. Network 112 facilitates wireless or wireline communication. Network 112 may communicate, for example, IP packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Server system 106 may include a processing module 114 and a memory module 116. Processing module 114 may include one or more microprocessors, controllers, or any other suitable computing devices or computing resources. Processing module 114 may work, either alone or with other components of system 100, to provide a portion or all of the functionality of system 100 described herein. Memory module 116 may take the form of volatile or non-volatile memory including, without limitation, magnetic media, optical media, random access memory (RAM), read-only memory (ROM), removable media, or any other suitable memory component. Although a single server system 106 is illustrated, some embodiments contemplate system 100 including any suitable number of server systems 106. Moreover, although referred to as a "server system," some embodiments contemplate server system 106 comprising any suitable type of processing device or devices.

System 100 may include one or more cloud computing systems 108 and 110. Cloud computing systems 108 and 110 may include one or more electronic computing devices operable to receive, transmit, process, and store data associated with system 100. For example, cloud computing systems 108 and 110 may include one or more general-purpose PCs, Macintoshes, workstations, Unix-based computers, server computers, one or more server pools, or any other suitable devices. In short, cloud computing systems 108 and 110 may include any suitable combination of software, firmware, and hardware. It should be noted that although two cloud computing systems 108 and 110 are illustrated, any suitable number of cloud computing systems may be included in system 100. In addition, there may be multiple groups of cloud computing systems in system 100.

In certain embodiments, cloud computing systems 108 and 110 provide computing resources 124 and 126, respectively, to user systems 102 and administrative systems 104 and charges user systems 102 and administrative systems 104 for their specific use of computing resources 124 and 126. For example, cloud computing resources 124 and 126 may include one or more virtual machines. As another example, cloud computing resources 124 and 126 may include one or more machine images. A machine image may refer to a bootable file that includes a particular configuration and operating system. As yet another example, cloud computing resources 124 and 126 may include one or more Intel x86 based servers that provide a combination of hardware and software resources.

In certain embodiments, computing resources 124 and 126 may be accessible by cloud computing interfaces 120. From the perspective of user systems 102 and administrative systems 104, renting computing resources from cloud computing interfaces 120 has implications for application providers and IT architects that develop solutions targeted for internal enterprise deployment, rather than on cloud computing systems 108 and 110. For example, an IT architect may desire to deploy web servers, load balancers, and front-end interfaces remotely on cloud computing systems 108 and 110 but keep a database in a local IT environment. Further, from an ITIL process perspective, many large organizations may implement an ITIL approach by performing well-defined automated processes. Since an ITIL process may be agnostic to platform and technological tools, it may be desirable to integrate such practices with advances in technology, such as cloud computing systems 108 and 110.

In certain embodiments, server system 106 may include a cloud computing system architecture 118. Cloud computing system architecture 118 may refer to any suitable hardware and/or software operable to integrate ITIL software components with cloud computing systems 108 and 110 and their respective computing resources 124 and 126. For example, a connection may be established between cloud computing system architecture 118 and cloud computing systems 108 and 110. A second connection may be established between cloud computing system architecture 118 and an external integration architecture that includes the ITIL software components. As described in more detail below, cloud computing system architecture 118 includes management components that provide integration points to connect the ITIL software components with computing resources 124 and 126 of cloud computing systems 108 and 110.

In certain embodiments, a secure connection may be established between cloud computing system architecture 118 and cloud computing systems 108 and 110 over network 112. For example, a secure Hypertext Transfer Protocol (HTTP) connection may be established between cloud computing system architecture 118 and cloud computing systems 108 and 110. A secure HTTP protocol refers to a protocol that provides the ability for secure transactions to take place over network 112. In alternative networks, any suitable data communications protocol may be used to establish a secure connection. Additional details of example embodiments of cloud computing system architecture 118 are discussed in more detail below.

Figure 2:
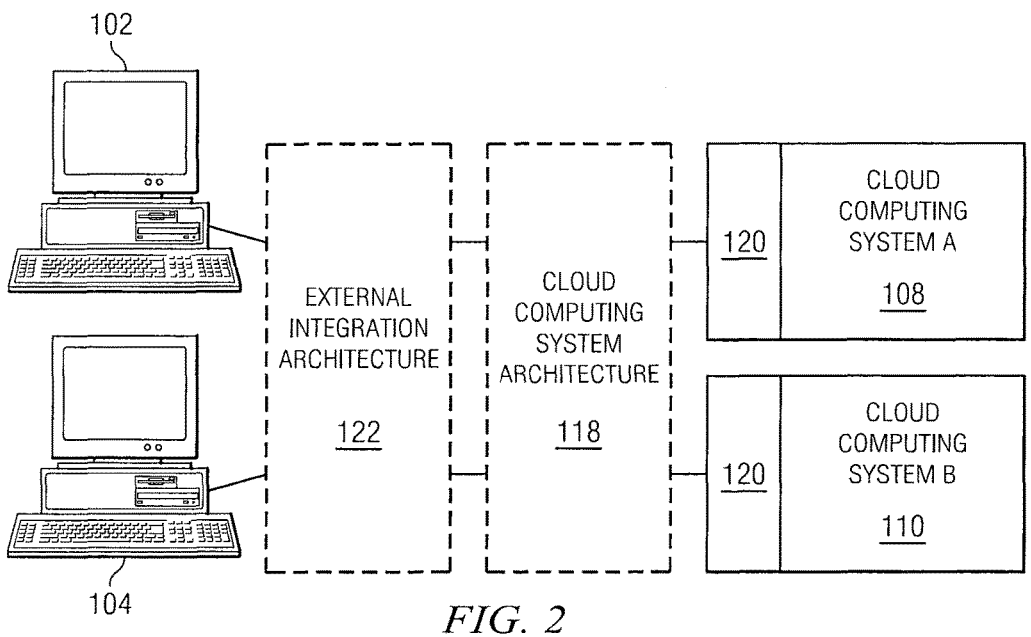
FIG. 2 illustrates an example external integration architecture and the cloud computing system architecture of FIG. 1, according to certain embodiments.

FIG. 2 illustrates external integration architecture 122 and cloud computing system architecture 118 of FIG. 1 according to some embodiments. As described above, external integration architecture 122 may include several ITIL software components. For example, external integration architecture 122 may include an ITIL software component that enables organization of the IT strategies and ongoing initiatives. As another example, external integration architecture 122 may include an ITIL software component that sets and monitors agreements based on service requests, negotiates with supply chain managers, sets agreements for operations and services, and/or catalogs the results. As yet another example, external integration architecture 122 may include an ITIL software component that captures defined and offered services. As yet another example, external integration architecture 122 may include an ITIL software component that performs continuous analysis in order to evaluate service trends for optimization. As yet another example, external integration architecture 122 may include an ITIL software component that maintains the deployment of the designed services, tracking and reporting the deployed assets within an organization, and/or maintains information on the topology and system infrastructure and the life cycle for design changes and releases. As yet another example, external integration architecture 122 may include an ITIL software component that measures the services provided on an ongoing basis with the goal of ensuring a high level of quality is maintained across the IT investments, displays the overall status and health of the system to the consumer, and/or maintains ongoing provisioning, recovery, backup and redundancy of the IT assets within a datacenter, including countermeasures and remedies. As yet another example, external integration architecture 122 may include an ITIL software component that provides proactive planning capabilities through the analysis of IT behavior, detects, utilization patterns and change history, determines if Service Level Agreements (SLAs) are being met, alerts a consumer that a problem is starting to appear, which may provide the consumer with the possibility of mitigating the issue before it becomes critical. As yet another example, external integration architecture 122 may include an ITIL software component that manages users and controls their access to the resources in the system based on, for example, their organizational role. As yet another example, external integration architecture 122 may include an ITIL software component that manages the distributed data stores for the organization, provisions and allocates storage resources, and/or provides the ability to restore IT services back to operation through a workflow and life cycle of incidents that concludes with incident resolution. As described in more detail below, computing system architecture 118 includes management components that provide integration points to connect the ITIL software components with computing resources of cloud computing systems 108 and 110.

Figure 3:
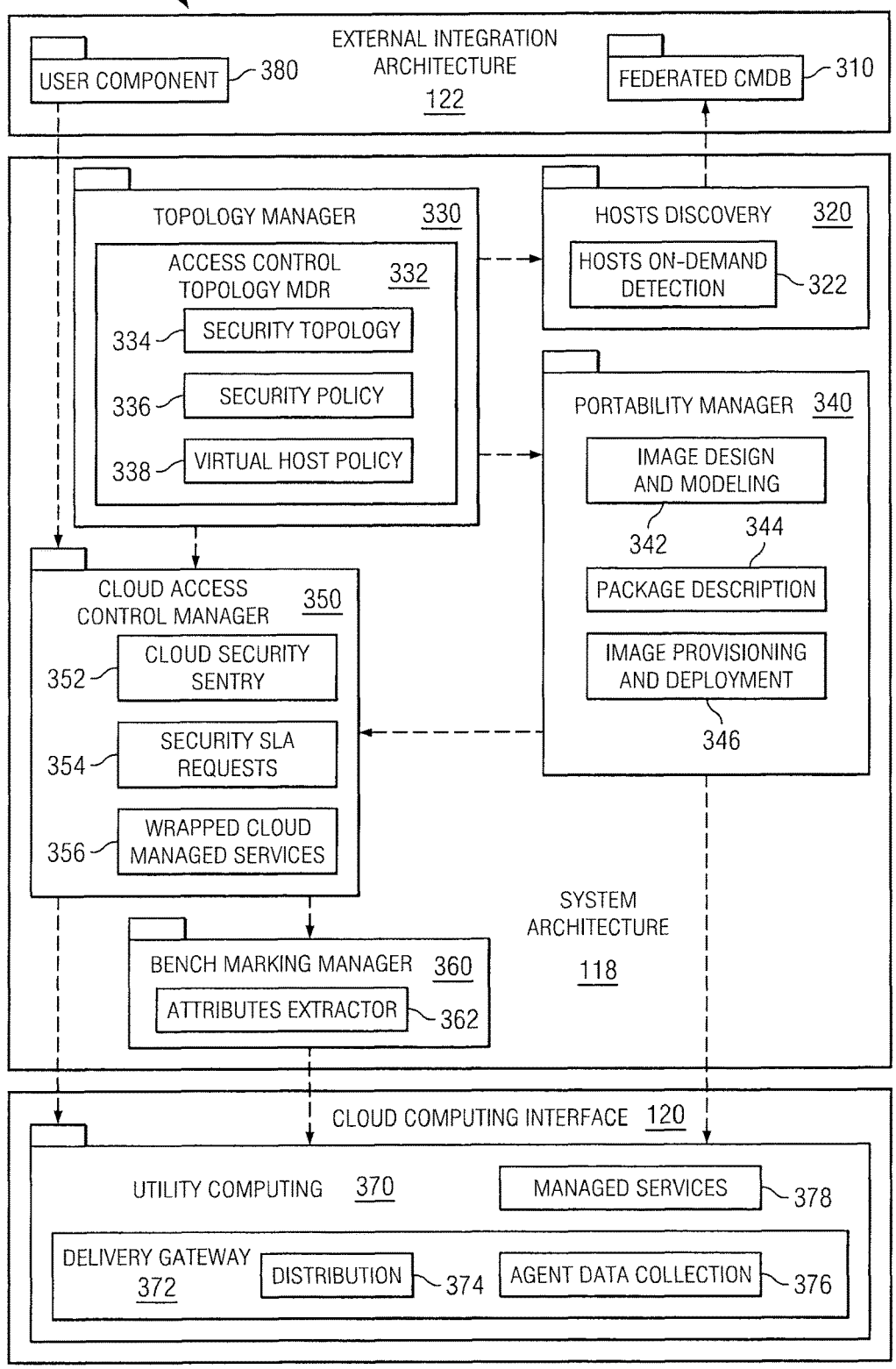
FIG. 3 illustrates example details of the external integration architecture and cloud computing system architecture of FIGS. 1 and 2, according to certain embodiments.

FIG. 3 illustrates example details of the external integration architecture 122, the cloud computing system architecture 118, and the cloud computing interfaces 120 (collectively, the "system 300") of FIGS. 1 and 2 according to some embodiments. The system 300 features a federated configuration management database (CMDB) 310, a hosts discovery component 320, a topology manager 330, a portability manager 340, a cloud access control manager 350, a benchmarking manager 360, a utility computing module 370, and cloud users component 380. Although this particular implementation of the system 300 is illustrated and primarily described, embodiments may include any suitable implementation of the system 300 according to particular needs.

In some embodiments, the federated CMDB 310 may be responsible for storing updated versions of new servers and hosts, as well as maintaining a "snapshot" of the IT deployed (and discovered) assets.

In some embodiments, the hosts discovery component 320 may be responsible for extracting a list of hosts from the federated CMDB 310 according to a criteria using a hosts-on-demand detection component 322. The hosts-on-demand detection component 322 may be responsible for activating requests from the federated CMDB 310. In some embodiments, the hosts-on-demand detection component 322 may produce the discovery of configuration items as a set or by certain criteria and may enable security managers to select specific IT sectors to be handled. The hosts-on-demand detection component 322 may correlate any discrepancies between the managed repositories and ensure that security blueprints are up to date.

In some embodiments, the topology manager 330 may trigger a query from the hosts-on-demand detection component 322 for a list of specific hosts according to a compliance need. In some embodiments, the topology manager 330 may feature an access control topology Model Data Repository (MDR) 332. The access control topology MDR 332 may contain a security topology 334 of all the hosts in the IT system that are candidates to be enforced, as well as their security policy 336 and their virtual host policy 338. The virtual host policy 338 may be used in cases of virtual host operation systems that support many images of virtual hosts, known as guests. In some embodiments, a need for enforcement may trigger either the deployment of agents using the portability manager 340 and/or the distribution of regular or virtual policies using the cloud access control manager 350.

In some embodiments, the portability manager 340 may manage provisioning transformation and portability of deployed images from one cloud computing system to another, due to SLA optimizations and/or on-demand provisioning of cloud resources as a result of a shortage of resources within the customer internal data center, or other reasons, by re-packing the deployed entities according to the cloud computing system definitions. In the illustrated embodiment, portability manager 340 includes an image design and modeling component 342, a package description component 344, and an image provisioning and deployment component 346. In certain embodiments, portability manager 340 may deploy machine images to at least one cloud computing system based on instructions from an external integration architecture, such as external integration architecture 122 of FIG. 2.

In one example embodiment, if one cloud computing system is not meeting SLA requirements, portability manager 340 may repack the deployed entity according to the new cloud computing system definitions and port it to a new cloud computing system. For example, image design and modeling component 342 may define a configuration model of the entities that need to be packaged. In one embodiment, the image design and modeling component 342 may update the package description component 344 to add definitions on upgrades and changes. The image design and modeling component 342 may also receive requests from the topology manager 330 to deploy an agent on the new server, determine an optimal version of agent to be deployed, and construct (model) the composition of components as an image. The image design and modeling component 342 may define a unique vender package and request to provision the image from the image provisioning and deployment component 346.

The package description component 344 may generate the packaging instructions and configuration descriptions for a specific cloud computing system. The image provisioning and deployment component 346 may initiate the actual deployment of a certain configured machine image for a specific cloud computing system. In some embodiments, the image provisioning and deployment component 346 may rollout, configure, or re-deploy a patch for an enforcing agent or install new enforcing agents based on discovered entities. Such action may be triggered, for example, by access control compliance needs. The image provisioning and deployment component 346 may maintain images to be deployed, and teachings of certain embodiments recognize that the image provisioning and deployment component 346 may include the capability to rapidly scale and solve multiple deployment needs. The image provisioning and deployment component 346 upload the image into the cloud by deploying the image through the utility computing module 370. In some embodiments, the image provisioning and deployment component 346 may obtain permission from the cloud access control manager 350 before uploading the image.

In some embodiments, the cloud access control manager 350 may provide the security aspects of controlling the entry points to the cloud computing systems. In the illustrated embodiment, the cloud access control manager 350 includes a cloud security sentry component 352, a security SLA requests component 354, and a wrapped cloud managed services component 356. In certain embodiments, cloud access control manager 350 may provide security for an external integration architecture, such as external integration architecture 122 of FIG. 2.

For example, the cloud security sentry 352 may provide managed guarded-call as a broker and provide interceptors to the utility computing module 370. As an interceptor, the cloud security sentry 352 may prohibit actual implementations of the cloud web services. The cloud security sentry 352 may prevent a non-authorized access to any related managing aspects originating from within the customer side (externally to the cloud). The cloud security sentry 352 may provide transient allocation of security permits to the provisioning and benchmarking components and enable only these components to access the cloud for changing images. The cloud security sentry 352 may also intercept security policy distribution that is activated directly from the topology and/or rents permissions to the provision and benchmarking components.

Security SLA requests component 354 may act as a remote proxy for compliance access control tools. Security SLA requests component 354 may mediate requests to deploy security and access control policies on roaming users, hosts, and servers. The security SLA requests component 354 may provide a bridge to IT access control in terms of administration operations; in some embodiments, the security SLA requests component 354 may act like a remote proxy for regular compliance access control tools. In some embodiments, the security SLA requests component 354 may forward and monitor requests of access policy and/or restrictions on moving the physical location of images, as well as request reports and monitoring information. In some embodiments, the security SLA requests component 354 may use the benchmarking manager 360 to extract the data from the cloud and provide limitations on the roaming capabilities of the cloud. The security SLA requests component 354 may invoke the utility computing module 370 for retrieving reports and monitoring data and for propagating security enforcement requests to the cloud vendor. The wrapped cloud managed services 356 may provide managed services, as well as prevent cloud administration un-authorized calls and serve as an interception guard.

In some embodiments, the benchmarking manager 360 may compare published capabilities of cloud computing systems and the relevant alternatives, including future self-investments in hardware and software as well as existing investments, by enabling comparative lists of cloud computing system attributes (such as provided hardware, cost for storage, cost for usage, and network bandwidth, as examples). In the illustrated embodiment, benchmarking manager 360 includes an attributes extractor component 362. In certain embodiments, benchmarking manager 360 may generate a comparative list of one or more published capabilities of the cloud computing systems and provide this information to an external integration architecture, such as external integration architecture 122 of FIG. 2.

For example, benchmarking manager 360 may access the non-functional characteristics of one or more cloud computing systems (such as pricing, supported hardware, SLA and quality attributes). These attributes may be provided to the attributes extractor component 362, which evaluates and composes accumulated values for each cloud computing system, comparing them against the customer quality attributes, which may provide customer specific prioritization of one or more cloud computing systems. In some embodiments, the attributes extractor component 362 may accumulate information such as virtual host name, virtual host identifiers (e.g., MAC addresses), and virtual machine configuration data (such as network interfaces, external disks, and input/output ports).

In some embodiments, the utility computing module 370 may include a delivery gateway 372, a distribution component 374, an agent data collection component 376, and a managed services component 378. The delivery gateway component 372 may be deployed within the cloud vendor's site and may be able to accept and delegate the need for internal policy enforcement on physical servers and virtual hosts (which may include operation systems that support hardware and operating system virtualization, or server virtualization). The distribution component 374 may be responsible for receiving and delegating the access control policy, delegating those to internal enforcement agents. The agent data collection component 376 may be responsible for collecting internal reporting information about the statuses of the system, delegating that information to the cloud users component 380. The managed services component 378 may include vendor proprietary services that provide interactions with the utility computing module 370 solutions.

In some embodiments, the cloud users 380 may allow regular administrators of the IT organization to interact with the cloud information, such as by using supervised services. The cloud users component 380 may include single sign-on capabilities. The cloud users component 380 may prepare interaction with the cloud specific calls by using the organization regular methodologies and unifying the different cloud vendor languages. In some embodiments, the cloud users 380 may obtain secured access to cloud resources through the cloud access control manager 350, which may intercept management calls from the cloud users 380.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A system comprising one or more processors coupled to a memory, the one or more processors being configured to execute logic encoded in the memory to:
   maintain a security topology of a plurality of virtual hosts in a cloud computing deployment, the security topology associating a plurality of security policies with the plurality of virtual hosts, the security policies including access control security policies;
   wherein each of the plurality of virtual hosts comprises operations systems that support server virtualization;
   determine if one or more hosts from among the plurality of virtual hosts are in compliance with their corresponding one or more access control security policies;
   access a topology manager having an access control topology, wherein the access control topology includes a security policy that identifies a respective security policy for each particular one of the plurality of virtual hosts, wherein the respective security policy is selected from a plurality of different security policies governing the plurality of virtual hosts;
   identify one or more candidate hosts that are capable of complying with the one or more security policies associated with the one or more virtual hosts in response to determining that the one or more virtual hosts are not in compliance with their corresponding one or more access control security policies;
   repackage the one or more virtual hosts for deployment on the identified one or more candidate host;
   determining that each of the one or more candidate hosts are provided by a specific vendor;
   in response to determining that the one or more candidate hosts are provided by the specific vendor, including in a unique vendor package that includes the one or more virtual hosts for deployment, instructions and configurations in compliance with the specific vendor; and
   port the repackaged one or more virtual hosts to the one or more candidate hosts.

2. The system of claim 1, wherein:
   the unique vendor package comprises an optimal access control agent that is configured to deploy on the specific vendor's candidate host, the access control agent being configured to control entry points to the one or more candidate hosts.

3. The system of claim 2, wherein the access control agent is configured to control entry points to the cloud computing deployment by:
   intercepting cloud management calls from an administrator;
   determining whether cloud management calls are authorized; and
   preparing the cloud management calls for interaction with a specific vendor.

4. The system of claim 1, wherein the one or more processors are further configured to execute logic encoded in the memory to extract non-functional characteristics of the cloud computing deployment.

5. The system of claim 4, wherein the non-functional characteristics comprise a virtual host name, a virtual host identifier, and a list of virtual host configuration data.

6. The system of claim 1, wherein the one or more processors are further configured to execute logic encoded in the memory to maintain a security topology by:
   requesting discovery of a list of hosts deployed on the cloud computing deployment; and
   associating the list of hosts with the one or more security policies.

7. The system of claim 6, wherein the one or more processors are further configured to execute logic encoded in the memory to maintain a security topology by:
   requesting discovery of an updated list of hosts deployed on the cloud computing deployment;
   resolving discrepancies between the list of hosts and the updated list of hosts; and
   updating the security topology.

8. A method comprising:
   maintaining a security topology of a plurality of hosts in a cloud computing deployment, the security topology associating one or more security policies with the plurality of hosts, the security policies including access control security policies;
   determining if one or more of the plurality of hosts are in compliance with their corresponding one or more access control security policies;
   in response to determining that the one or more of the plurality of hosts are not in compliance with their corresponding one or more access control security policies, identifying one or more candidate hosts that are capable of complying with the one or more security policies associated with the one or more of the plurality of hosts; and repackaging the one or more hosts for deployment on the identified one or more candidate host;

determining that each of the one or more candidate hosts are provided by a specific vendor;

in response to determining that the one or more candidate hosts are provided by the specific vendor, including in a unique vendor package that includes the one or more virtual hosts for deployment, instructions and configurations in compliance with the specific vendor; and porting the repackaged one or more hosts to the one or more candidate hosts.

9. The method of claim 8, wherein:

the one or more candidate hosts are provided by a specific vendor, and repackaging the one or more hosts comprises repackaging the one or more hosts as a unique vendor package, the unique vendor package comprising instructions and configurations in compliance with the specific vendor; and the unique vendor package comprises an optimal access control agent that is configured to deploy on the specific vendor's candidate host, the access control agent being configured to control entry points to the one or more candidate hosts.

10. The method of claim 9, wherein the access control agent controls entry points to the cloud computing deployment by:

intercepting cloud management calls from an administrator;

determining whether cloud management calls are authorized; and preparing the cloud management calls for interaction with a specific vendor.

11. The method of claim 8, further comprising extracting non-functional characteristics of the cloud computing deployment.

12. The method of claim 11, wherein the non-functional characteristics comprise a virtual host name, a virtual host identifier, and a list of virtual host configuration data.

13. The method of claim 8, wherein the method at the topology manager further comprises:

requesting discovery of a list of hosts deployed on the cloud computing deployment; and associating the list of hosts with the one or more security policies.

14. The method of claim 13, wherein the method further comprises:

requesting discovery of an updated list of hosts deployed on the cloud computing deployment;

resolving discrepancies between the list of hosts and the updated list of hosts; and updating the security topology.

15. Logic encoded in one or more non-transitory computer-readable storage media for execution and when executed operable to:

maintain a security topology of a plurality of hosts in a cloud computing deployment, the security topology associating one or more security policies with the plurality of hosts, the security policies including access control security policies;

determine if one or more of the plurality of hosts are in compliance with their corresponding one or more access control security policies;

in response to determining that the one or more of the plurality of hosts are not in compliance with their corresponding one or more access control security policies, identify one or more candidate hosts that are capable of complying with the one or more security policies associated with the one or more of the plurality of hosts;

repackage the one or more hosts for deployment on the identified one or more candidate host;

determine that each of the one or more candidate hosts are provided by a specific vendor;

in response to determining that the one or more candidate hosts are provided by the specific vendor, include in a unique vendor package that includes the one or more virtual hosts for deployment, instructions and configurations in compliance with the specific vendor; and port the repackaged one or more hosts to the one or more candidate hosts.

16. The logic of claim 15, wherein:

the candidate host is provided by a specific vendor, and the logic is configured to repackage the one or more hosts as a unique vendor package, the unique vendor package comprising instructions and configurations in compliance with the specific vendor; and the unique vendor package comprises an optimal access control agent that is configured to deploy on the specific vendor's candidate host, the access control agent being configured to control entry points to the one or more candidate hosts.

17. The logic of claim 16, wherein the access control agent is configured to control entry points to the cloud computing deployment by:

intercepting cloud management calls from an administrator;

determining whether cloud management calls are authorized; and preparing the cloud management calls for interaction with a specific vendor.

18. The logic of claim 15, further logic encoded in one or more non-transitory computer-readable storage media for execution and when executed operable to extract non-functional characteristics of the cloud computing deployment.

19. The logic of claim 18, wherein the non-functional characteristics comprise a virtual host name, a virtual host identifier, and a list of virtual host configuration data.

20. The logic of claim 15, wherein the logic is configured to maintain a security topology by:

requesting discovery of a list of hosts deployed on the cloud computing deployment; and associating the list of hosts with the one or more security policies.

21. The logic of claim 20, wherein the logic is configured to maintain a security topology by:

requesting discovery of an updated list of hosts deployed on the cloud computing deployment;

resolving discrepancies between the list of hosts and the updated list of hosts; and updating the security topology.

* * * * *